(12) United States Patent
Kwon

(10) Patent No.: US 6,697,269 B2
(45) Date of Patent: Feb. 24, 2004

(54) SINGLE-STAGE CONVERTER COMPENSATING POWER FACTOR

(75) Inventor: Bong-hwan Kwon, Pohang (KR)

(73) Assignee: Pohang University of Science and Technology Foundation, Pohang (KR)

( * ) Notice: Subject to any disclaimer, the term of this patent is extended or adjusted under 35 U.S.C. 154(b) by 0 days.

(21) Appl. No.: 10/244,019

(22) Filed: Sep. 16, 2002

(65) Prior Publication Data

US 2003/0161169 A1 Aug. 28, 2003

(30) Foreign Application Priority Data

Feb. 23, 2002 (KR) .......................................... 2002-9740

(51) Int. Cl.$^7$ ............................................... H02M 1/12
(52) U.S. Cl. ............................. 363/39; 363/37; 363/47; 363/21.04
(58) Field of Search ........................... 363/21.04, 21.07, 363/21.12, 21.15, 37, 39, 45, 46, 47

(56) References Cited

U.S. PATENT DOCUMENTS 6,069,801 A  *  5/2000  Hodge et al. ............ 363/21.02
6,366,474 B1  *  4/2002  Gucyski ...................... 363/20
6,473,318 B1  *  10/2002  Qian et al. ................ 363/21.16
6,519,164 B1  *  2/2003  Weng et al. ............. 363/21.04

* cited by examiner

Primary Examiner—Jessica Han
(74) Attorney, Agent, or Firm—Leydig, Voit & Mayer, Ltd.

(57) ABSTRACT

A single-stage converter improving power factor. The single-stage converter includes a power factor improving unit, a bridge diode unit, a voltage smoothing condenser, a transformer circuit unit, and a main switch. The power factor improving unit is connected to a input power source, the bridge diode unit is located next to the power factor improving unit and provides a current path, the voltage smoothing condenser stores electrical energy provided through the bridge diode unit, the transformer circuit unit is located between the bridge diode unit and the voltage smoothing condenser, and the main switch is connected to each of the bridge diode unit, the voltage smoothing condenser, and the transformer circuit unit and controls provision of voltage to the transformer circuit unit. Thus, the single-stage converter can improve the power factor of the input terminal.

2 Claims, 5 Drawing Sheets

SINGLE-STAGE CONVERTER COMPENSATING POWER FACTOR

BACKGROUND OF THE INVENTION

1. Field of the Invention

The present invention relates to a power factor compensating single-stage converter, and more particularly, to a single-stage converter which improves the power factor by connecting an input voltage to a predetermined location of the primary winding of a transformer through a diode and a feedback inductor.

2. Description of the Related Art

Generally, a rectifier receives an ac voltage and outputs a dc voltage. Also, a dc-dc converter converts a dc voltage to an ac voltage, raises or lowers the voltage, and rectifies the ac voltage. This converter uses a pulse-width modulation (PWM) method. The types of converter include a flyback converter, a forward converter, a half-bridge converter, and a full-bridge converter.

Since today's electronics apparatuses have characteristics that change very sensitively to the ripple of a dc voltage, researches to reduce the ripple of an output dc voltage continue. In a prior art embodiment for reducing the ripple of the output dc voltage, a condenser input-type rectifying method is used when an ac power is converted into a dc power. The condenser input-type rectifying method uses a large condenser comprising a full-bridge rectifier, the input terminal of which comprises four diodes. However, if a large condenser is used, due to the pulse-type charge current, the power factor of the ac input terminal is degraded down to 0.5–0.6. Since the power factor is increasingly controlled by regulations, degradation in the power factor is not desirable.

FIG. 1A is a schematic diagram of the structure of an embodiment of the prior art converter, and FIG. 1B is a waveform for explaining the operation of the prior art converter.

Referring to FIG. 1A, since in a half-cycle, diodes $D_1$ and $D_4$ flows current, and in another half-cycle, $D_2$ and $D_3$ flows current, the output waveform is as shown in FIG. 1B.

Referring to FIG. 1B, since in interval $[0, t_1]$ a voltage being supplied is greater than the voltage $V_d$ that is charged to the condenser $C_d$, a charging current flows. Meanwhile, in interval $[t_1, t_2]$ where the output voltage decreases, $C_d$ discharges, and the time constant of the interval where the voltage decreases is the multiplication of load $R_0$ and the capacitance $C_d$ of the condenser.

Thus, interval $[0, t_1]$ for obtaining a charging current is much shorter than the discharging interval $[t_1, t_2]$. Therefore, the power factor of the converter shown in FIG. 1A is degraded because of the charging current of the condenser used to reduce the ripple of the output voltage. Also, since an input current flows only when the input voltage $V_i$ is greater than the voltage between both ends of the condenser, the input current flows like a pulse around the maximum value of the input voltage and therefore contains more harmonic components compared to a sine wave current. To solve this problem, a power factor improving unit is introduced to the input part.

In a discontinuous current mode boost converter which is generally used, the current of the power source naturally follows the sine wave shape of the voltage of the power source. However, only when the output voltage of the power factor improving unit is far greater than the maximum value of the input voltage, the power factor improves. If the output voltage of the power factor improving unit increases, the voltage provided to semiconductor devices also increases, and in order to stand this voltage stress, a semiconductor switch having large voltage rating should be used. Meanwhile, since a semiconductor switch having large voltage rating also has large resistance, on-loss of the switch increases and accordingly the efficiency of the entire system is degraded. Therefore, development of a converter which can improve the efficiency of the entire system by reducing on-loss of the switch and also improving the power factor of an input terminal is very needed.

SUMMARY OF THE INVENTION

To solve the above problems, it is an objective of the present invention to provide a power factor compensating converter which improves the power factor by connecting a rectified input voltage to a predetermined location of the primary winding of a transformer through a diode and a feedback inductor.

To accomplish the objective of the present invention, there is provided a power factor compensating single-stage converter comprising a power factor improving unit which is connected to a predetermined input power source; a bridge diode unit which is located next to the power factor improving unit and provides a current path; a voltage smoothing condenser which stores electric energy provided through the bridge diode unit; a transformer circuit unit which is connected to the bridge diode unit and the voltage smoothing condenser; and a main switch which is connected to each of the bridge diode unit, the voltage smoothing condenser, and the transformer circuit unit and controls provision of voltage to the transformer circuit unit, wherein the power factor improving unit comprises two diodes connected to the input power source through a filter inductor, a condenser connected to two diodes, and a feedback inductor, one end of which is connected to a common contact of the two diodes and the other end of which is connected to a predetermined part of the primary winding of the transformer through a predetermined diode.

It is preferable that the main switch and the transformer circuit unit are constructed so that the converter is used as a flyback converter, a forward converter, or a half-bridge converter.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, referring to attached drawings, preferred embodiments of a power factor compensating single-stage converter according to the present invention will now be explained in detail.

Figure 1A:
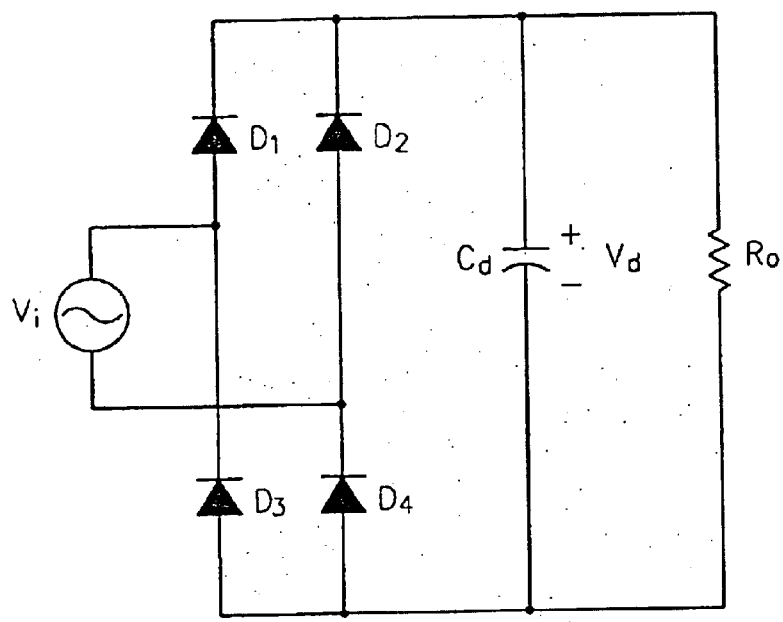
FIG. 1A is a schematic diagram of the structure of a prior art converter.
Figure 1B:
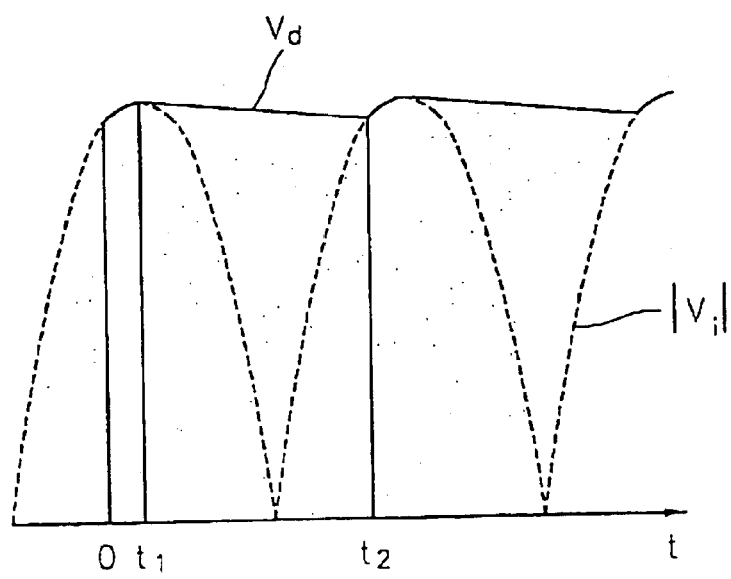
FIG. 1B is a waveform for explaining the operation of the converter of FIG. 1A.
Figure 2:
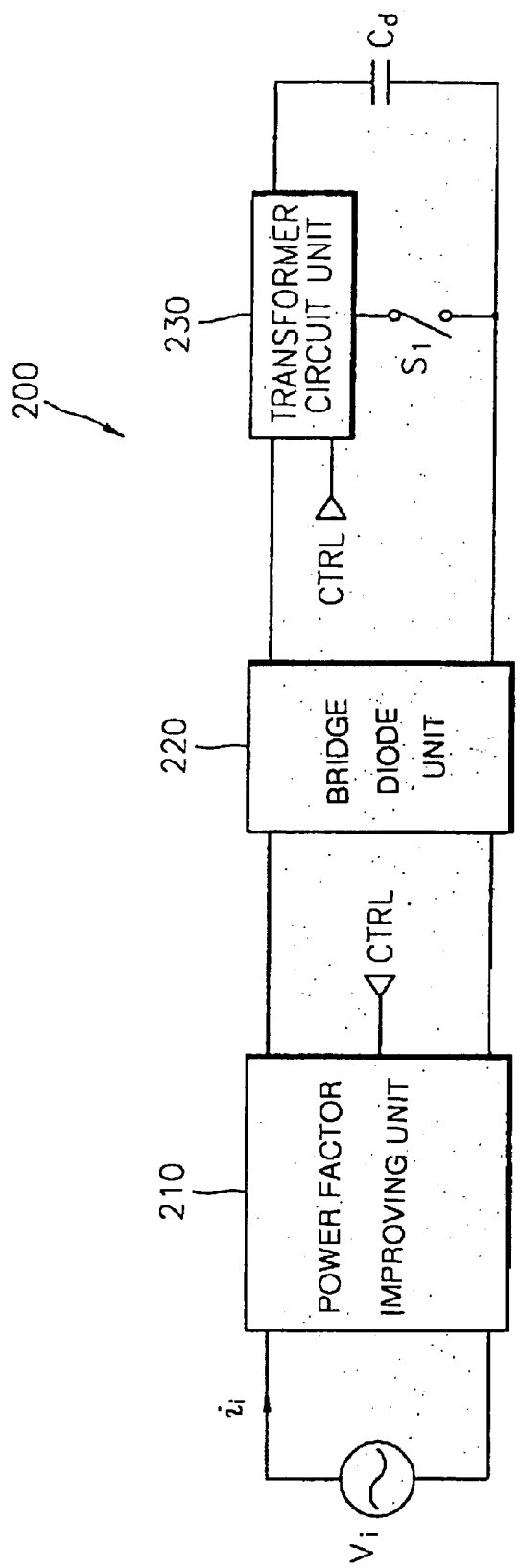
FIG. 2 is a block diagram of a power factor compensating single-stage converter according to the present invention.
Figure 3:
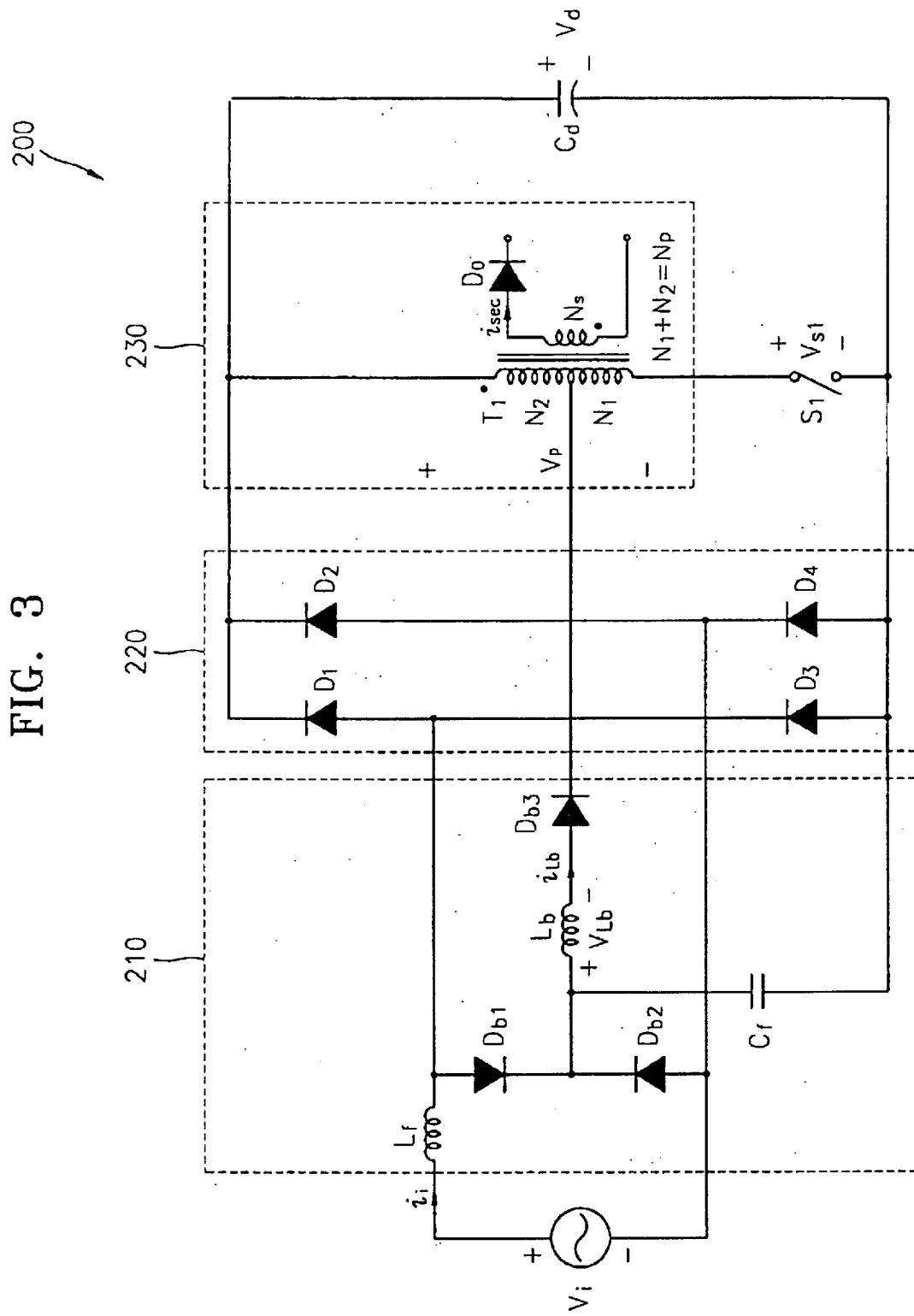
FIG. 3 is a circuit diagram of a power factor compensating single-stage converter according to the present invention.
Figure 4:
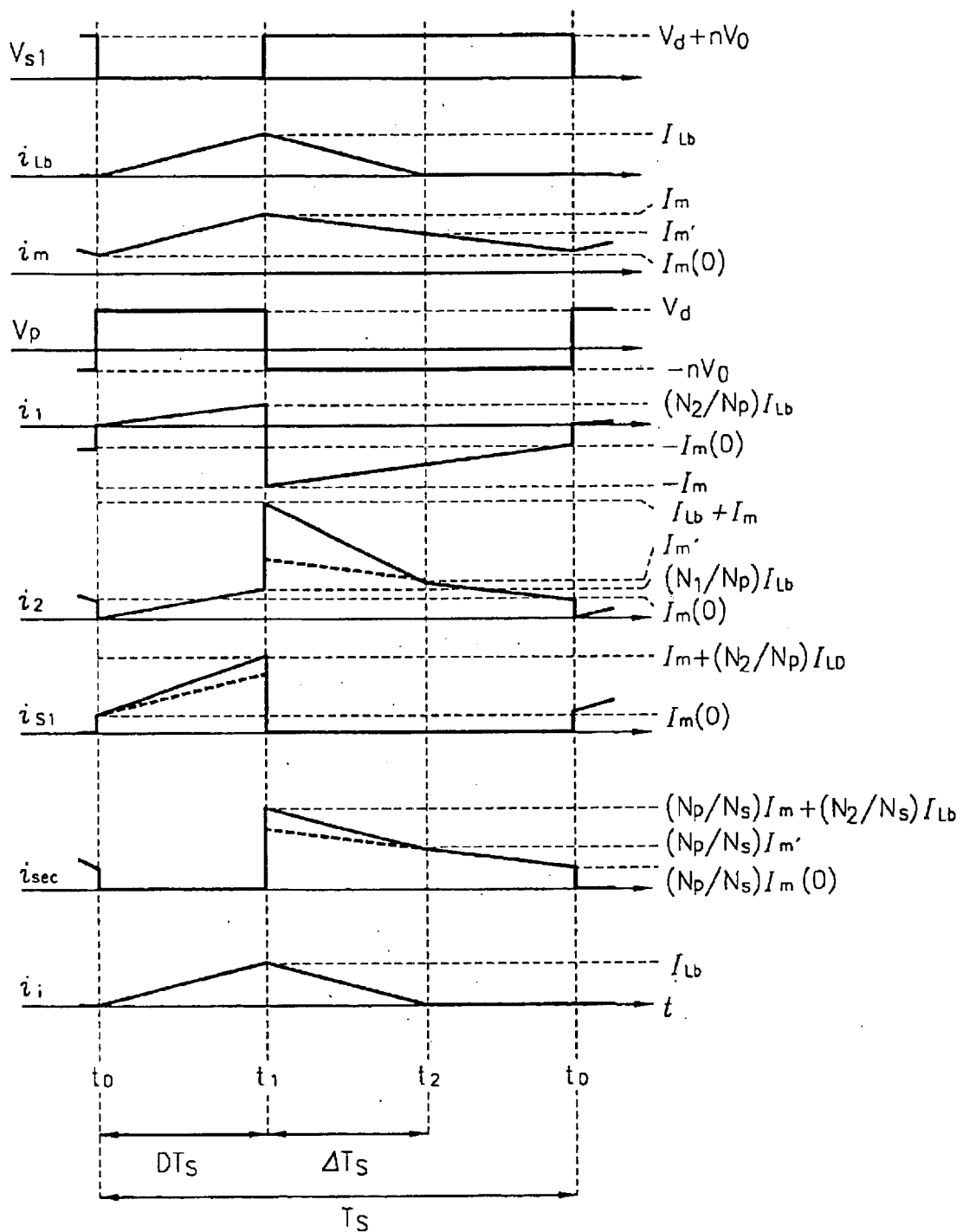
FIG. 4 is a waveform diagram for explaining the operation of each part of the single-stage converter shown in FIG. 3.
Figure 5:
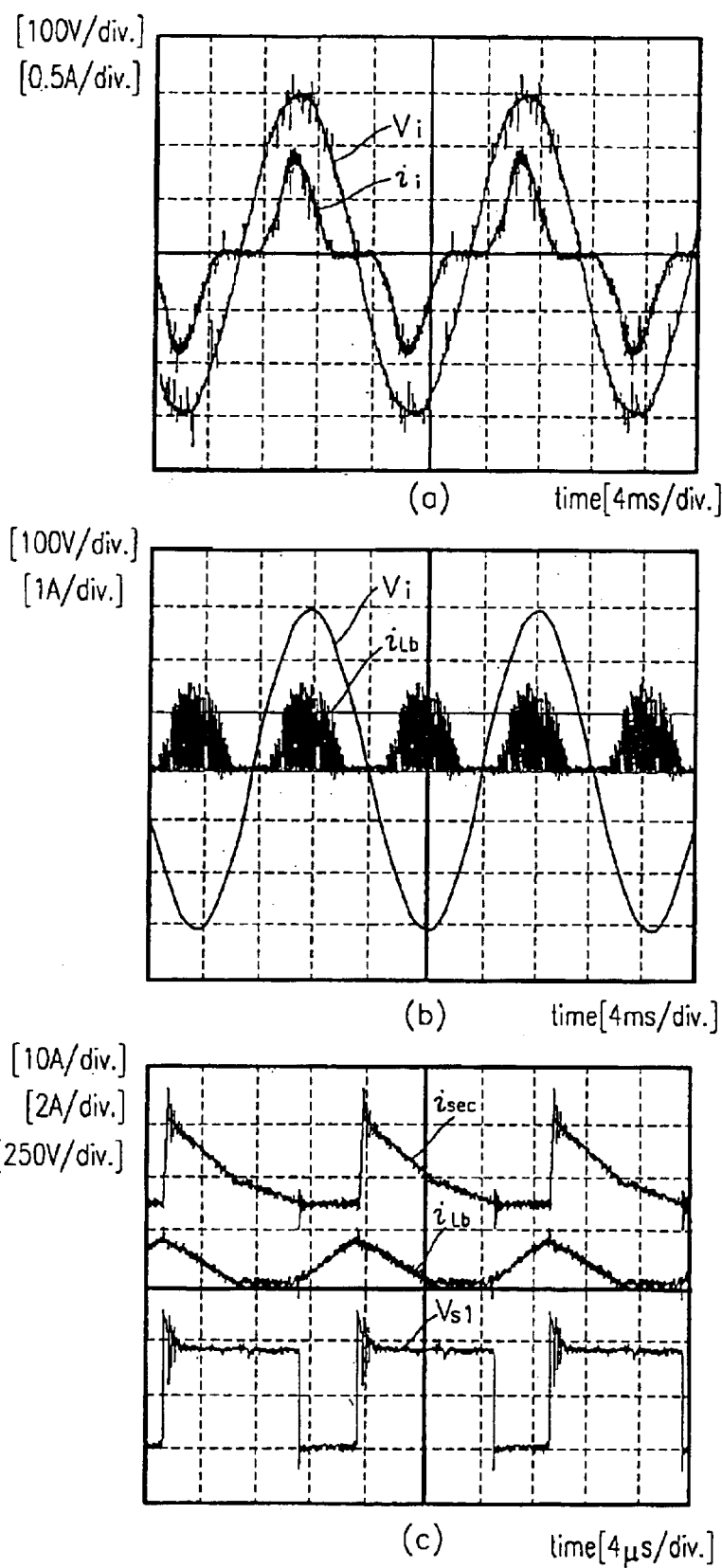
FIG. 5 includes waveform diagrams of the performance of a single-stage converter according to the invention.

FIG. 2 is a block diagram of a power factor compensating single-stage converter according to the present invention, FIG. 3 is a detailed circuit diagram of a power factor compensating single-stage converter according to the present invention, FIG. 4 is a waveform diagram for explaining the operation of each part of the single-stage converter shown in FIG. 3, and FIG. 5 is a waveform diagram of experiments of the single-stage converter shown in FIG. 3.

Referring to FIGS. 2 and 3, the power factor compensating single-stage converter 200 according to the present invention comprises the input voltage (power source) $V_i$, a power factor improving unit 210, a bridge diode unit 220, a transformer circuit unit 230, a main switch $S_1$, and a voltage smoothing condenser $C_d$.

The bridge diode unit 220 is located next to the power factor improving unit 210 and provides a current path, and transfers electric energy to the voltage smoothing condenser $C_d$. The voltage smoothing condenser $C_d$ stores the electric energy provided by the bridge diode unit 220.

Main switch $S_1$ together with the transformer circuit unit 230 is built so that the converter can be applied as flyback-type, forward-type, and half-bridge-type converters. That is, the main switch $S_1$ and the transformer circuit unit 230 can be used as flyback-type, forward-type, and half-bridge-type converters.

As shown in FIG. 3, the power factor improving unit 210 comprises LC filter ($L_f$, $C_f$), and two diodes $D_{b1}$ and $D_{b2}$ connected to the input voltage through the filter inductor $L_f$. The common connection point of these two diodes $D_{b1}$ and $D_{b2}$ is connected to a predetermined location of the primary winding of transformer $T_1$ of the transformer circuit unit 230 through the feedback inductor $L_b$ and the diode $D_{b3}$, and the input current provided from the input voltage $V_i$ increases or decreases according to the magnitude of the input voltage.

By duty of the main switch $S_1$, the output voltage of the single-stage converter 200 shown in FIG. 2 is adjusted. In addition, the main switch $S_1$ performs a single-stage voltage control function which controls the output voltage and at the same time improves the power factor of the input terminal.

Hereinafter, the single-stage converter 200 according to the present invention will be explained in more detail.

Referring to FIG. 3, the single-stage converter 200 according to the present invention comprises the input voltage $V_i$, the power factor improving unit 210, the bridge diode unit 220, the transformer circuit unit 230, the main switch $S_1$, and the voltage smoothing condenser $C_d$ as described above.

The bridge diode unit 220 comprises four diodes $D_1$, $D_2$, $D_3$, and $D_4$ that are connected in a full-bridge shape. The main switch $S_1$ is connected to one end of the voltage smoothing condenser $C_d$ and the transformer circuit unit 230 as shown in FIG. 3.

The power factor improving unit 210 comprises LC filter ($L_f$, $C_f$), and two diodes $D_{b1}$ and $D_{b2}$ connected to the input voltage through the filter inductor $L_f$. The common connection point of these two diodes $D_{b1}$ and $D_{b2}$ is connected to a predetermined location (CTRL; FIG. 2) of the primary winding of transformer $T_1$ of the transformer circuit unit 230 through feedback inductor $L_b$ and diode $D_{b3}$.

Referring to FIG. 3, the action and operation of the power factor compensating single-stage converter 200 according to the present invention will now be explained. For convenience of explanation, the magnetizing inductance $L_m$ of the transformer $T_1$ is considered. However, this process is only for convenience of explanation and does not limit the scope of the present invention.

First, it is assumed that the main switch $S_1$ is turned on. The current $i_{Lb}$ flowing through the feedback inductor $L_b$ flows only when the input voltage is greater than the voltage of part $N_1$ of the primary winding of the transformer, and is zero when the input voltage is smaller than the voltage of part $N_1$ of the primary winding of the transformer $T_1$. If it is assumed that the input voltage is greater than the voltage of part $N_1$ of the primary winding of the transformer $T_1$, a predetermined size of voltage is provided to the feedback inductor $L_b$, and the current linearly increases. Also, a predetermined size of voltage $V_d$ is provided to the magnetizing inductance $L_m$ of the transformer $T_1$, and the current linearly increases. At this time, since the diode $D_0$ of the output part of the transformer $T_1$ is in a reverse direction state, current does not flow through the secondary winding of the transformer $T_1$. If the switch $S_1$ is turned off, the diode $D_0$ of the output part of the transformer $T_1$ becomes in a forward direction state, a predetermined reverse voltage is provided to the feedback inductor $L_b$, the current flowing through the feedback inductor $L_b$ linearly decreases, and the current flowing through the magnetizing inductance also linearly decreases. At this time, the energy stored in the feedback inductor $L_b$ and the magnetizing inductance is provided to the output unit of the transformer $T_1$. If the current flowing through the feedback inductor $L_b$ decreases and arrives at zero, the diode of the power factor improving unit 210 is in a reverse direction state, and the current flowing through the feedback inductor $L_b$ remains zero. From this time, only the energy stored in the magnetizing inductance $L_m$ is continuously provided to the output unit of the transformer $T_1$.

FIG. 4 is a waveform diagram for explaining the operation of each part of the single-stage converter shown in FIG. 3.

Referring to FIG. 4, it is assumed that the switch $S_1$ is turned off before time to. Therefore, the current $i_{Lb}$ flowing through the feedback inductor $L_b$ before time $t_0$ is its minimum value, that is zero, linearly increases from time $t_0$ to time $t_1$, and finally arrives at its maximum value $I_{Lb}$. After time $t_1$, current flows through the diode $D_0$ of the output unit, the energy stored in the feedback inductor $L_b$ is provided to the output unit of the transformer $T_1$. Then, a predetermined voltage is provided to the feedback inductor $L_b$ and the current $i_{Lb}$ linearly decreases. At time $t_2$, the energy stored in the feedback inductor $L_b$ is all provided to the transformer $T_1$, and the current flowing through the feedback inductor $L_b$ remains zero until current flows through the switch $S_1$ next time.

Likewise, if the switch $S_1$ is turned on at time $t_0$, the voltage $V_p$ which is provided to the magnetizing inductance $L_m$ becomes constant at $V_d$. Accordingly, the current flowing through the magnetizing inductance $L_m$ linearly increases from the initial value ($I_m(0)$) to time $t_1$, and arrives at the maximum value ($I_m$). After the switch $S_1$ is turned off at time $t_1$, the diode $D_0$ of the output unit becomes in a reverse direction state, the energy stored in the magnetizing inductor is provided to the output unit of the transformer $T_1$, and a predetermined reverse voltage is provided to the magnetizing inductance. Accordingly, the magnetizing current linearly decreases. This process continues till the switch $S_1$ is turned on next time.

The current flowing through the feedback inductor $L_b$ are divided into currents $i_1$ and $i_2$ flowing through the primary winding of the transformer $T_1$ at $[t_0, t_1]$, and the sum of the current flowing through the magnetic inductance $L_m$ and current $i_1$ is the current flowing through the switch $S_1$. At this time, no current flows through the secondary winding of the transformer $T_1$.

At $[t_1, t_2]$, the current $i_1$ flowing through the primary winding of the transformer is the same as the current flowing through the magnetizing inductance, and the current $i_2$ is the same as the sum of the current flowing through the feedback inductor $L_b$ and the current flowing through the magnetizing inductance. At this time, through the secondary winding of the transformer, the current flowing through the magnetizing inductance and the current flowing through the feedback inductor flow according to the winding ratio of the transformer.

At $[t_2, t_3]$, the currents $i_1$ and $i_2$ flowing through the primary winding of the transformer are the same as the current flowing through the magnetizing inductance, and the current flowing through the magnetizing inductance flows through the secondary winding of the transformer according to the winding ratio of the transformer. Here, the current flowing through the feedback inductor $L_b$ is almost the input current, and the magnitude of this average input current is in proportion to the input voltage, the power factor improves. Thus, the extent of improvement in the power factor is determined by the size of the inductance of the feedback inductor $L_b$ and the part $N_1$ of the primary winding of the transformer $T_1$.

FIG. 5 is a waveform diagram of experiments of the single-stage converter shown in FIG. 3. Since the input current faithfully follows the waveform of the input voltage as shown in FIG. 5, the power factor measured through the experiment is 0.88 that shows improvement in the power factor.

As described above, in the power factor compensating single-stage converter according to the present invention, the common connection point of two diodes that are connected to the input power through an inductor is connected to a predetermined location of the primary winding of the transformer through a feedback inductor and a diode such that the power factor of the input terminal is improved.

Optimum embodiments have been explained above and are shown. However, the present invention is not restricted to the above-described embodiments and many variations are possible within the present invention.

What is claimed is:

1. A power factor compensating single-stage converter comprising:

a power factor improving unit for connection to an input power source;

a bridge diode unit coupled to the power factor improving unit and providing a current path;

a voltage smoothing condenser which stores electrical energy provided through the bridge diode unit;

a transformer circuit unit coupled between the bridge diode unit and the voltage smoothing condenser and including a transformer; and a main switch connected to each of the bridge diode unit, the voltage smoothing condenser, and the transformer circuit unit and controlling supply of voltage to the transformer circuit unit, wherein the power factor improving unit comprises:

first and second diodes connected in series in opposed polarity, an inductor, the first and second diodes and the inductor being connected in series across the input power source, a condenser connected to a junction of the first and second diodes, a third diode, and a feedback inductor, a first terminal which is connected to the junction of the first and second diodes and a second terminal of which is connected to a primary winding of the transformer of the transformer circuit unit through the third diode.

2. The converter of claim 1, wherein the main switch and the transformer circuit unit are constructed so that the converter is one of a flyback converter, a forward converter, and a half-bridge converter.

* * * * *